United States Patent [19]
Asamizuya

[11] Patent Number: 6,009,098
[45] Date of Patent: *Dec. 28, 1999

[54] DATA TRANSMISSION APPARATUS AND DATA TRANSMISSION METHOD

[75] Inventor: Noboru Asamizuya, Kanagawa, Japan

[73] Assignee: Sony Corporation, Tokyo, Japan

[ * ] Notice: This patent is subject to a terminal disclaimer.

[21] Appl. No.: 09/022,582

[22] Filed: Feb. 12, 1998

Related U.S. Application Data

[63] Continuation of application No. 08/640,840, filed as application No. PCT/JP95/01854, Sep. 18, 1995, Pat. No. 5,844,897.

[30] Foreign Application Priority Data

Sep. 16, 1994 [JP] Japan ................................. 6-222286

[51] Int. Cl.$^6$ ............................. H04L 12/88; H04L 12/56
[52] U.S. Cl. ......................... 370/395; 370/476; 370/465
[58] Field of Search .................................. 370/465, 466, 370/467, 395, 535, 536, 528, 542–544, 529, 412, 476; 371/30, 37.1

[56] References Cited

U.S. PATENT DOCUMENTS

| | | | |
|---|---|---|---|
| 5,260,936 | 11/1993 | Bardet et al. | 370/536 |
| 5,550,825 | 8/1996 | McMullan, Jr. et al. | 370/536 |
| 5,583,574 | 12/1996 | Tanaka et al. | 370/536 |

*Primary Examiner*—Ajit Patel
*Attorney, Agent, or Firm*—Frommer Lawrence & Haug, LLP; William S. Frommer

[57] ABSTRACT

A data transmission apparatus suitable for use for a VOD system etc. able to supply program data in response to a request made at any time. In the data transmission apparatus (1) of the present invention, the video data to be supplied is first transferred to a high speed accessible recording apparatus in the transmitter (10$_{-i}$). This recording apparatus for example performs high speed access in less than a fraction of the real time of the video data and reproduces several locations predetermined time intervals apart simultaneously. At this time, preferably an error correction code is pre-recorded at the time of recording in the recording apparatus. At the time of reproduction, the apparatus reads data from the recording apparatus at a high speed in units of physical blocks of the transfer data of the recording apparatus, adds header information etc. by the formatter (20$_{-i}$) to make the formats match, produces ATM cells, and outputs them through the data exchange (60) to the transmission lines. Due to this, it is possible to provide a data transmission apparatus with a simpler configuration of the format converting device, having a format converting circuit able to perform high speed processing with a simple configuration, able to increase the rate of transmission, and able to easily handle multiple channels.

8 Claims, 15 Drawing Sheets

FIG. 12

| s\t | 0 | 1 | 2 | 3 | 4 | ... | 707 | 708 | 709 | ... | 894 | 895 | 896 | ... | 1022 | 1023 |
|---|---|---|---|---|---|---|---|---|---|---|---|---|---|---|---|---|
| 0 | D(0) | D(124) | D(248) | D(372) | D(496) | ... | D(263) | D(387) | D(511) | ... | D(143) | D(267) | D(391) | ... | D(4361) | D(4485) |
| 1 | D(4009) | D(4733) | D(4857) | D(4981) | D(5105) | ... | D(4872) | D(4996) | D(5120) | ... | D(1826) | D(1950) | D(2074) | ... | D(3143) | D(3267) |
| 2 | D(3391) | D(3515) | D(3639) | D(3763) | D(3887) | ... | D(3654) | D(3778) | D(3902) | ... | D(3534) | D(3658) | D(3902) | ... | D(1925) | D(2049) |
| 3 | D(2173) | D(2297) | D(2421) | D(2545) | D(2669) | ... | D(1940) | D(2064) | D(2188) | ... | D(2316) | D(2440) | D(2564) | ... | D(707) | D(831) |
| 4 | D(955) | D(1079) | D(1203) | D(1327) | D(1451) | ... | D(1218) | D(1342) | D(1466) | ... | D(1098) | D(1222) | D(1346) | ... | D(5316) | D(5440) |
| 5 | D(5564) | D(5693) | D(5817) | D(109) | D(233) | ... | D(5727) | ECC(0,0) | ECC(1,0) | ... | ECC(45,3) | ECC(46,3) | | | | |

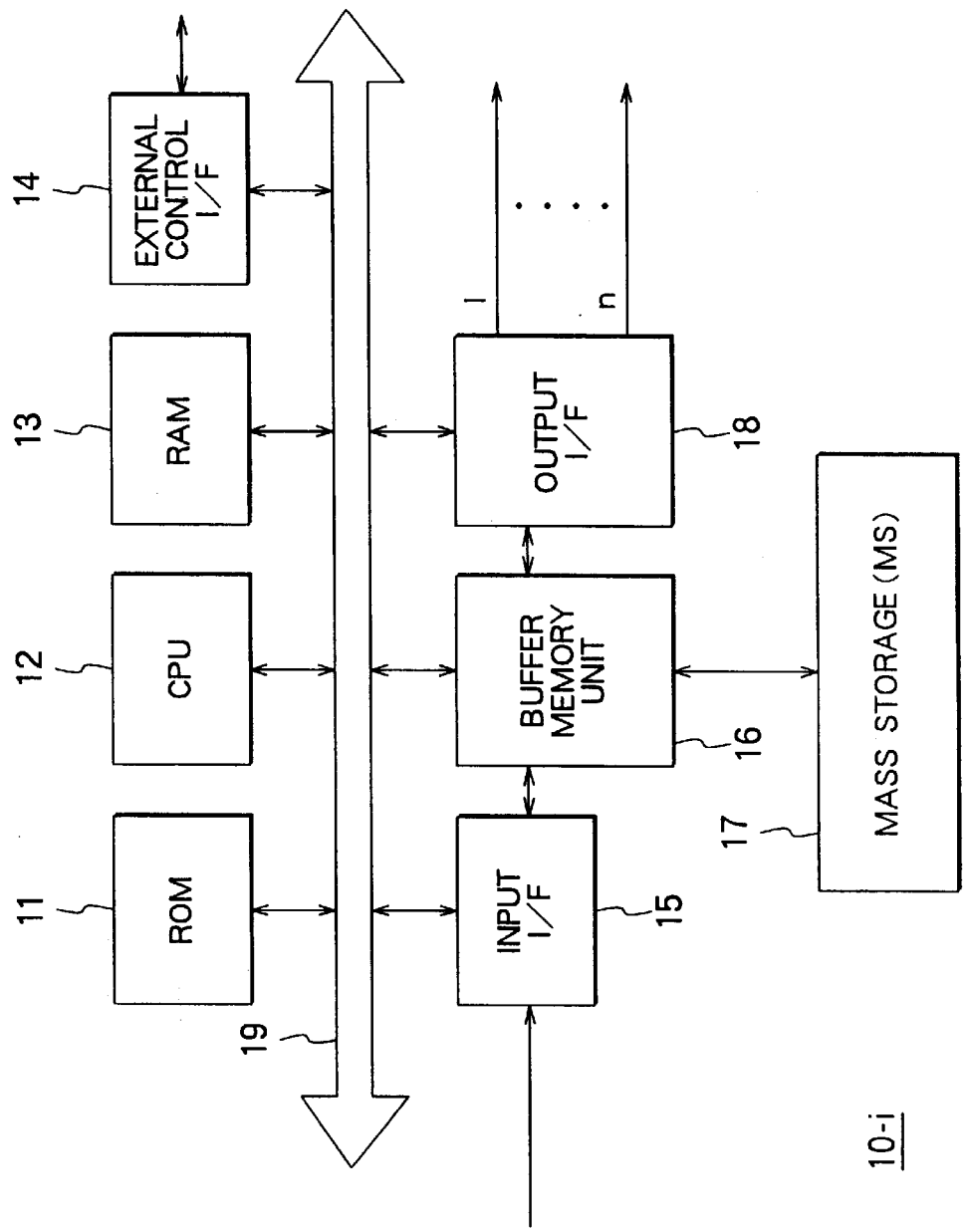

LIST OF REFERENCES

1 ... DATA TRANSMISSION APPARATUS
- 10 ... TRANSMISSION UNIT
  - 11 ... ROM
  - 12 ... CPU
  - 13 ... RAM
  - 14 ... EXTERNAL CONTROL INTERFACE
  - 15 ... INPUT INTERFACE
  - 16 ... BUFFER MEMORY UNIT
  - 17 ... MASS STORAGE
  - 18 ... OUTPUT INTERFACE
  - 19 ... BUS
  - 90 ... FEC GENERATION UNIT
- 20, 70 ... FORMATTER UNIT
  - 21, 71 ... FORMATTER BLOCK
    - 22, 72 ... FIRST SWITCH
    - 23, 73 ... FIRST BUFFER MEMORY
    - 24, 74 ... SECOND BUFFER MEMORY
    - 25, 76 ... BUFFER MEMORY CONTROLLER
    - 26, 27 ... SECOND SWITCH
    - 27, 78 ... HEADER INFORMATION ADDING UNIT
    - 28, 79 ... FORMATTER BLOCK CONTROL UNIT
  - 29, 80 ... MULTIPLEXER
  - 30, 81 ... CONTROL UNIT
- 40 ... SWITCHER
- 50 ... TRANSMISSION CONTROLLER
- 60 ... DATA EXCHANGE

DATA TRANSMISSION APPARATUS AND DATA TRANSMISSION METHOD

This APPLN is a CON of Ser. No. 08/640,840 May 7, 1996 now U.S. Pat. No. 5,844,897 which is a 371 of PCT/JP95/01854 Sep. 18, 1995.

TECHNICAL FIELD

The present invention relates to a data transmission apparatus and data transmission method which are suitable for use in, for example, a video-on-demand apparatus etc. which can deliver video data in accordance with a request made at any time.

BACKGROUND ART

Realization of a practical video-on-demand (VOD) system which can instantly provide program data in response to a request from a receiver has been desired. A VOD system able to individually respond to requests made at all times, however, requires an extremely large sized data transmission apparatus which performs complex processing.

Accordingly, a near-video-on-demand (NVOD) system which can simplify the configuration of the data transmission apparatus while realizing a function similar to that of a VOD system has been proposed. An NVOD system is a system that transmits program data to a plurality of channels at predetermined time intervals and selects the channel for the programs starting from the next time zone in response to requests made in a certain time zone to provide those programs.

The data transmission apparatus used for such an NVOD system also must process a large amount of AV data (audio data and video data) at a high speed. For example, at first the video data to be supplied is transferred from a large capacity recording apparatus in which a lot of data are recorded to a high speed accessible recording apparatus. Next, the data recorded in that recording apparatus is accessed at a high speed in a fraction of the reproduction time of the video data and data recorded at a plurality of locations predetermined times apart are simultaneously reproduced. Further error correction codes are added to the series of reproduced data which are then converted to a predetermined transmission format and transmitted to the transmission lines.

Accordingly, there is a demand for a data transmission apparatus able to perform this processing by a simpler hardware configuration and a data transmission method able to perform it more efficiently.

DISCLOSURE OF THE INVENTION

An object of the present invention is to provide a data transmission apparatus which can, by a simpler hardware configuration, transmit desired data, process it at a high speed for simplified processing, and thereby raise the speed of transmission and which can easily handle multiple channels.

Further, taking note of the fact that the reason why the means for converting the format of data for transmission becomes large in scale and high speed processing is required is the generation of the error correction codes, the present invention has as its object the simplification of the configuration of the means for converting the format and the simplification of the processing. Accordingly, the data transmission apparatus and data transmission method of the present invention preferably are configured so as to record data adding an error correction code when recording data in a recording apparatus as transmission data and so as not to have to generate an error correction code for transmission at the time of transmitting the data.

Further, the recording means for inputting and outputting data to and from the recording apparatus is complicated and requires high speed access, so often has a processor for controlling the recording apparatus. In such a case, that processor is used to add an error correction code in advance and record it together with the data in the recording apparatus in the transmission format.

Accordingly, the data transmission apparatus of the present invention comprises an error correction code adding means for preliminarily adding to video data an error correction code for correcting transmission error at the time of transmitting said video data by a predetermined transmission method and thereby generating error correction code added data, a storing means for storing said error correction code added data and operative to output the same in parallel to a plurality of channels, a plurality of format converting means each provided for the respective channels of said storing means for converting the error correction code added data output from the respective channels to transmission data of the transmission format based on a predetermined transmission method, and a transmitting means for transmitting said transmission data to a transmission line based on said predetermined transmission method.

Preferably, said storing means stores said video data and said error correction code rearranged to an array corresponding to the format conversion by said format converting means.

More preferably, said storing means generates block data comprised of said rearranged video data and said error correction code divided into blocks for each predetermined unit of data and stores the same for each said block data.

More preferably, said format converting means has at least one buffer memory means for temporarily storing said block data output from said storing means.

Specifically, said error correction code adding means adds a Reed-Solomon code to said video data as said error correction code.

More specifically, each said format converting means divides the error correction code added data output from said respective channels of said storing means into predetermined units and add predetermined head information to said divided data to generate said transmission data.

Still more specifically, each said format converting means divides said error correction code added data into predetermined units based on the asynchronous transfer mode (ATM) data transmission method.

Preferably, said storing means outputs said video data in parallel to a plurality of channels, said data transmission apparatus further has a multiplexing means for multiplexing the transmission data from the format converting means to generate multiplexed data, and said transmitting means transmits said multiplexed data to the transmission lines as said transmission data.

Specifically, said storing means outputs in parallel to a plurality of channels a plurality of series of data of the same video data predetermined time intervals apart, each said format converting means converts said data output from said respective channels to transmission data of a transmission format based on a predetermined transmission method, said multiplexing means multiplexes the transmission data from said format converting means to generate multiplexed data, said transmitting means transmits said multiplexed data, and one series of transmission data from the multiplexed plurality of series of transmission data is selected in response to a request originating in any time band so that said video data is supplied substantially immediately in response to said request.

Further, the data transmission method of the present invention includes the steps of adding to video data an error correction code for correcting transmission error at the time of transmitting said video data by a predetermined transmission method so as to generate error correction code added data, storing said error correction code added data in a storing means operative to output the same in parallel to a plurality of channels, converting the error correction code added data output from the channels by the storing means to transmission data of the transmission format based on a predetermined transmission method, and transmitting said transmission data based on said predetermined transmission method.

BRIEF DESCRIPTION OF THE DRAWINGS

The above object and features of the present invention will become more apparent from the following description with reference to the accompanying drawings, wherein:

FIG. 12 is a view of the arrangement of transfer data with respect to a mass storage of the transmitter shown in FIG. 4;

FIG. 14 is a view of the configuration of a transmitter of the data transmission apparatus shown in FIG. 1 according to a third embodiment of the present invention.

FIG. 15 is a list of reference numbers of the present invention.

BEST MODE FOR CARRYING OUT THE INVENTION

First embodiment

A first embodiment of the data transmission apparatus of the present invention will be explained by referring to FIG. 1 and FIG. 2.

The data transmission apparatus of this embodiment is a data transmission apparatus which is used for the transmission of data in an NVOD system and transmits a program so that the program can be received by a receiver which requests the reception of the program from substantially the time of the request.

Figure 1:
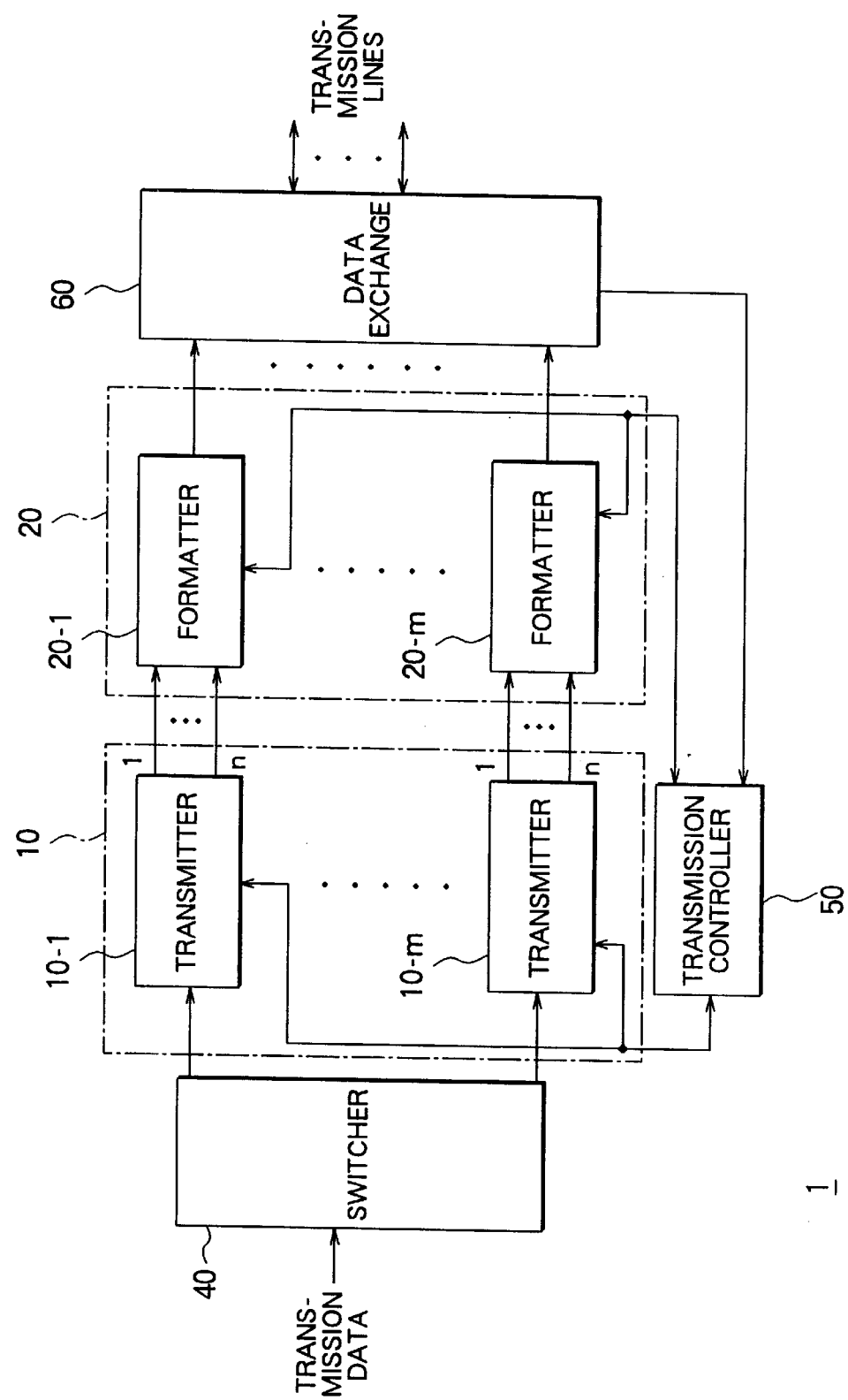
FIG. 1 is a view of the configuration of a data transmission apparatus according to the present invention.

FIG. 1 is a view of the configuration of this embodiment of the data transmission apparatus of the present invention.

The data transmission apparatus 1 comprises a switcher 40, a transmission unit 10, a formatter unit 20, a data exchange 60, and a transmission controller 50.

First, the operations of the different units constituting the data transmission apparatus 1 will be briefly explained referring to FIG. 1.

The switcher 40 inputs the program data from a not illustrated program library to one of m number of transmitters $10_{-1}$ to $10_{-m}$ of the transmission unit 10. The program library has recorded in it a plurality of series of program data which can be provided.

The transmission unit 10 is constituted by m number of transmitters $10_{-1}$ to $10_{-m}$, each of the transmitters $10_{-1}$ to $10_{-m}$ having n number of output channels. The transmitters $10_{-i}$ (i=1 to m) store the program data input through the switcher 40 in a format corresponding to the predetermined transmission method, generate a plurality of program data streams constant times apart, and simultaneously output the same from n number of output channels.

The formatter unit 20 is constituted by m number of formatters $20_{-1}$ to $20_{-m}$ corresponding to the m number of transmitters $10_{-1}$ to $10_{-m}$. The formatter unit 20 adds to the output data from the channels of the transmission unit 10 an error correction code, adds a header such as the destination information, constructs an ATM cell for transferring the data by the ATM (asynchronous transfer mode), multiplexes a large number of ATM cells, and then outputs the same to the data exchange 60.

The data exchange 60 is connected to a variety of transmission lines and transmits the data from the data transmission apparatus 1.

The transmission controller 50 controls the transmission unit 10, the formatter unit 20, and the data exchange 60 to make them perform desired operations, for example, the transfer of the program data from the program library to the transmission unit 10, the transfer of the program data from the transmission unit 10 to the formatter unit 20, the transmission of the program data to the origin of the request, etc. at desired timings.

The formatter unit 20 will be explained next referring to FIG. 2.

Figure 2:
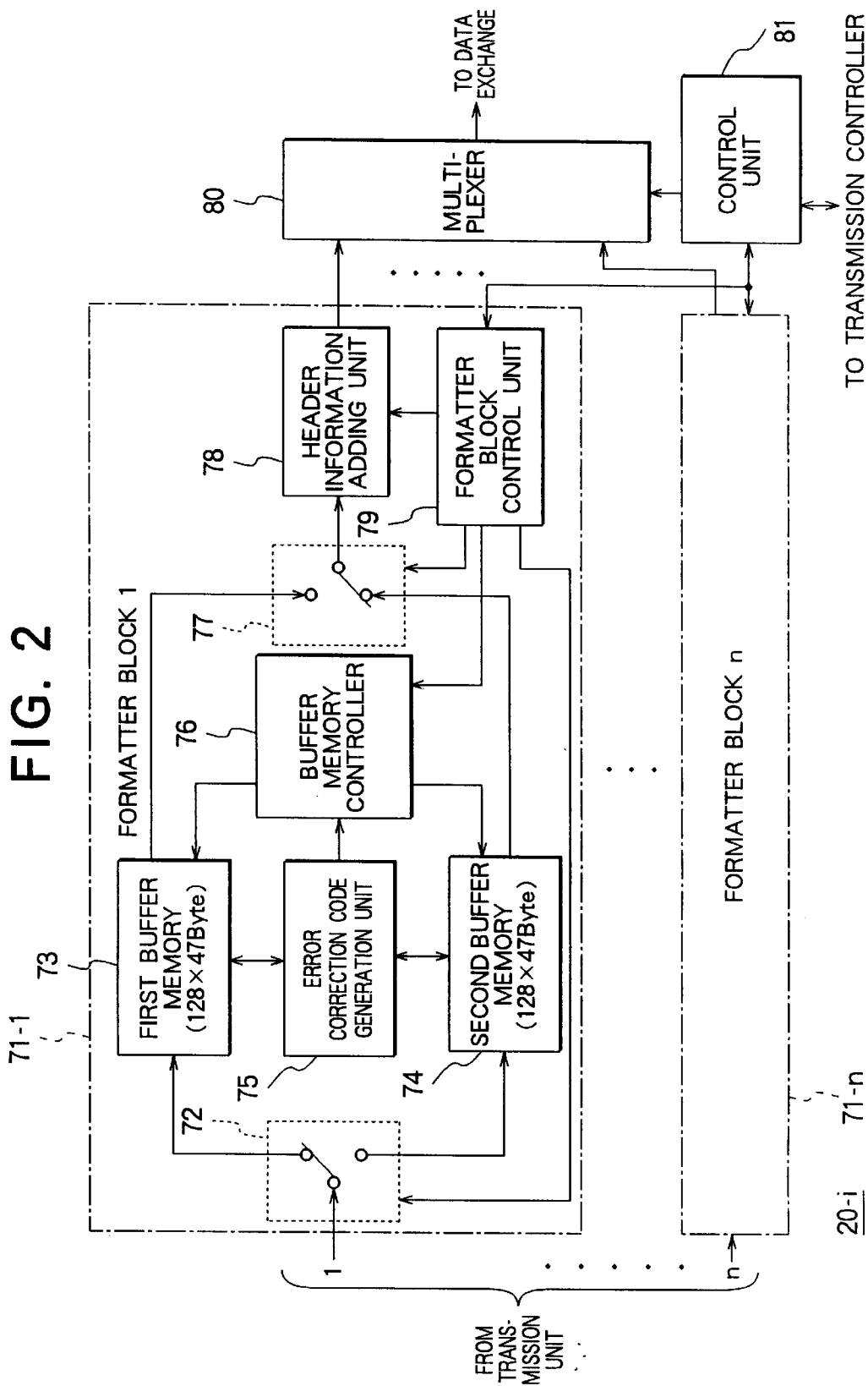
FIG. 2 is a view of the configuration of a formatter unit of a data transmission apparatus shown in FIG. 1 according to a first embodiment of the present invention.

FIG. 2 is a view of the configuration of the formatter $20_{-i}$ (i=1 to m) of the formatter unit 20.

The formatter $20_{-i}$ shown in FIG. 2 gives a forward error correction code (Reed-Solomon code) to the successively input data to generate ATM cells for transfer by the ATM.

In the formatter $20_{-1}$ shown in FIG. 2, the n channels of transmission data $D_1$ to $D_n$ are converted in format by the n number of formatter blocks $71_{-1}$ to $71_{-n}$.

In each formatter block $71_{-i}$ (i=1 to n), the input data passes through the first switch 72 to be successively stored in the first and second buffer memories 73, 74. Error correction codes are given to the data by the error correction code generation unit 75.

The data given the error correction codes are successively read out 47 bytes at a time and input through the second switch 77 to the header information adding unit 78. 6-byte header information (5 bytes of ATM header and 1 byte of header by protocol type) is given in the header information adding unit 78 so 53-byte ATM cells are produced.

The ATM cells produced by the n number of formatter blocks $71_{-1}$ to $71_{-n}$ are multiplexed by the multiplexer 80 and output to the data exchange 60.

Note that the buffer memory controller 76 controls the first and second buffer memories 73 and 74, the formatter block control unit 79 controls the first and second switches 72, 77, the buffer memory controller 76, and the header information adding unit 78, and the control unit 81 controls the n number of formatter blocks $71_{-1}$ to $71_{-n}$ and the multiplexer 80.

Further, the first and second buffer memories 73, 74 each have a capacity sufficient for storing data referred to when the error correction code generation unit 75 imparts an error correction code. In this embodiment, each has a capacity of 128×47 bytes.

By using this data transmission apparatus and reproducing the program data as a plurality of streams predetermined time intervals apart, it is possible to construct a data transmission apparatus able to transmit program data substantially immediately in response to a request made at a predetermined time zone.

Second embodiment

In the data transmission apparatus of the first embodiment explained above, the error correction code for transmission are given by the format converting circuit. The processing for producing this error correction code, however, is complicated, so a high performance computing means is necessary for the format converting circuit. Also, since it is necessary to refer to a large amount of data for producing the error correction code, it is necessary to ensure a sufficiently large memory capacity in the format converting circuit. Further, since high speed processing is required when processing data requiring reproduction in real time, such as video data, a much higher performance computing means and memory must be used.

A data transmission apparatus which solves the above problems and can be realized by a simpler hardware configuration will be explained next as a second embodiment of the present invention.

The data transmission apparatus of the second embodiment, like the data transmission apparatus of the first embodiment, is used for an NVOD system. The overall configuration is substantially the same as the configuration of the first embodiment shown in FIG. 1.

Figure 3:
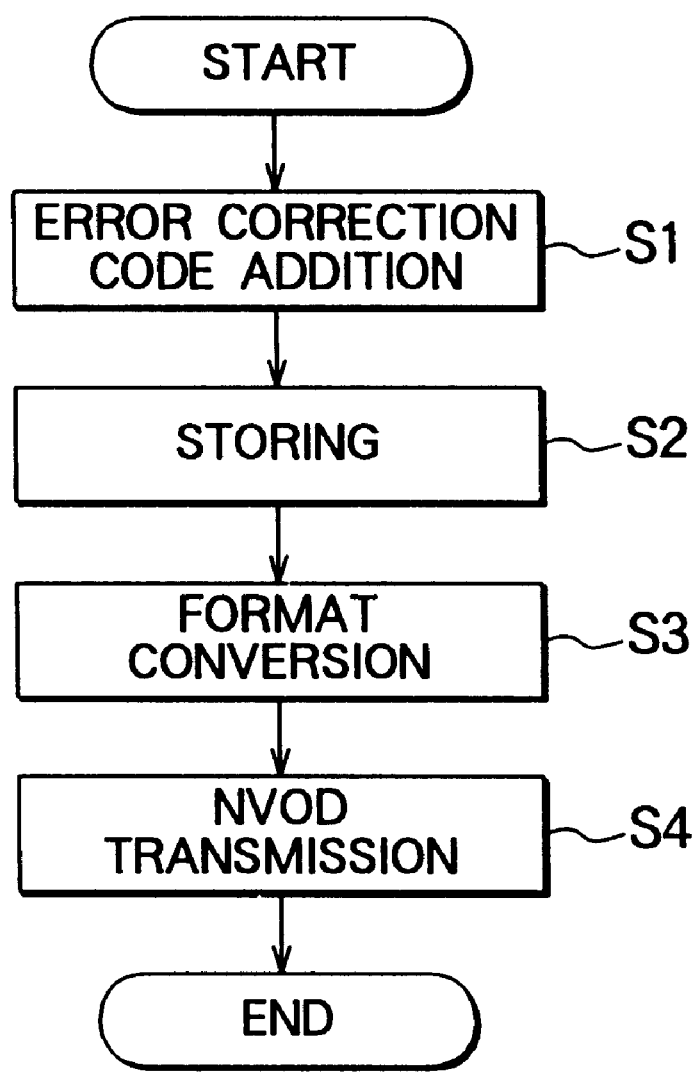
FIG. 3 is a flow chart for explaining the data transmission method of the present invention according to a second embodiment of the present invention.

In the data transmission apparatus of the second embodiment, however, the data is transmitted by the processing routine shown in FIG. 3. That is, the error correction code is given in advance to the supplied data (step S1). The data given the error correction code is then stored in a high speed accessible storage medium (step S2), is converted to the transmission format at the time of supply of the data (step S3), and is transmitted in an NVOD system (step S4).

The data transmission apparatus of the second embodiment, to perform the above operation, differs from the first embodiment in the configuration of the transmission unit 10 and the formatter unit 20.

The configuration and operation of the transmission unit 10 and the formatter unit 20 will be explained in detail referring to FIG. 4 to FIG. 6.

First, the configuration and operation of the transmission unit 10 will be explained.

The transmission unit 10 is constituted by n number of transmitters $10_{-1}$ to $10_{-n}$.

Figure 4:
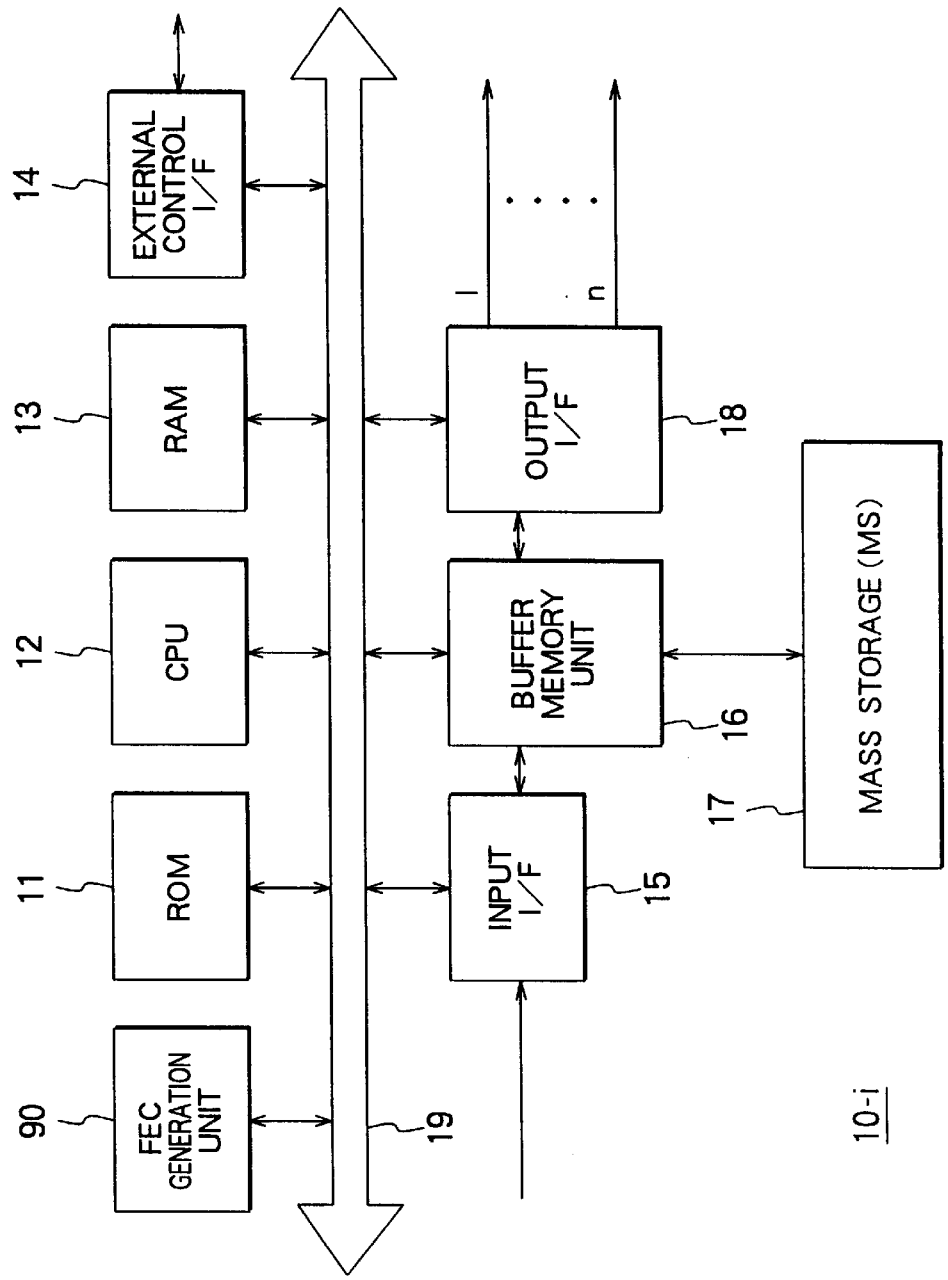
FIG. 4 is a view of the configuration of a transmitter of the data transmission apparatus shown in FIG. 1 according to the second embodiment of the present invention.
Figure 5:
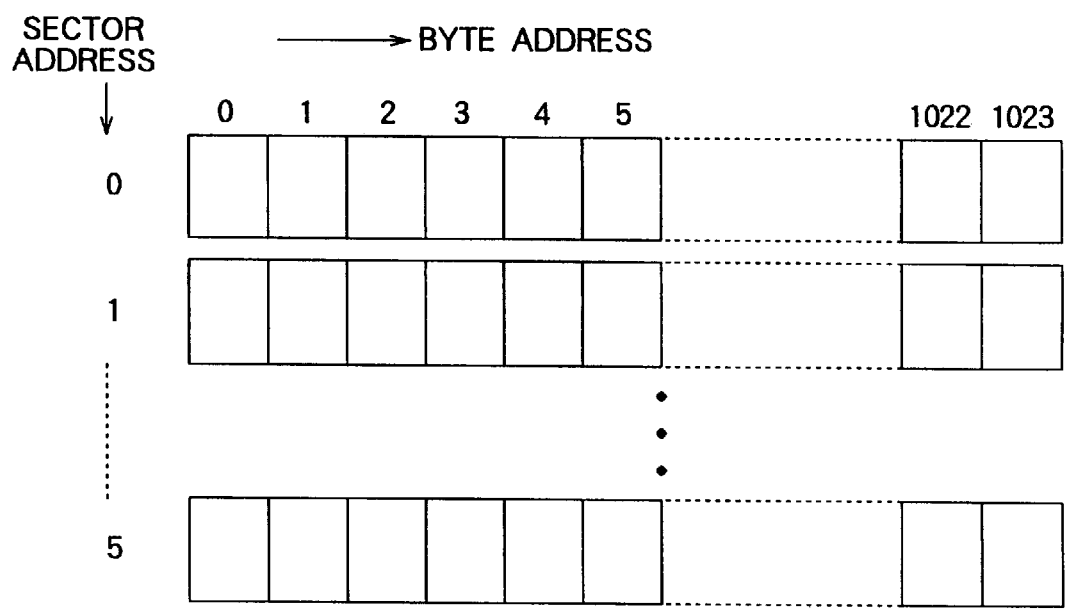
FIG. 5 is a view of the configuration of a recording region of a mass storage of the transmitter shown in FIG. 4.

FIG. 4 is a view of the configuration of a transmitter $10_{-i}$ (i=1 to n).

The transmitter $10_{-i}$ has a ROM 11, a CPU 12, a RAM 13, an external control interface 14, an input interface 15, a buffer memory unit 16, a mass storage 17, an output interface 18, an FEC (forward error correction code) generation unit 90, and a bus 19 connecting them.

The ROM 11 stores the programs to be executed by the CPU 12.

The RAM 13 is a main memory for executing a variety of operations in the CPU 12.

The external control interface 14 is an interface with the transmission controller 50. The CPU 12 executes a variety of processings based on commands from this transmission controller 50.

The input interface 15 is an interface receiving program data from the switcher 40. The input program data is once stored in the RAM 13 and then stored in the mass storage 17 via the buffer memory unit 16. Note that, an input I/F 15 can also directly perform the transfer of data with the buffer memory unit 16. Accordingly, it is also possible to directly store the input program data in the mass storage 17 via the buffer memory unit 16.

The mass storage 17 is a data storage device which is constituted by a hard disc device, a magneto-optic disc (MO) device, etc., has a large capacity, and can perform random access. In the mass storage 17, as shown in FIG. 5, the data is transferred in units of sectors, with 1024 bytes comprising a sector.

As the mass storage 17, for example, use may be made of one described in Japanese Patent Application No. 6-119342 filed previously by the present applicant.

The buffer memory unit 16 controls the transfer of the program data with the mass storage 17, the input interface 15, the output interface 18, and the bus 19. Due to the buffer memory unit 16, the data is theoretically transferred with the mass storage 17 in predetermined units. Note that in this embodiment the mass storage 17 performs the transfer of data physically in units of sectors (1024 bytes). Accordingly, the buffer memory unit 16 has at least one sector of a recording region.

The output interface 18 transfers the program data output from the mass storage 17 via the buffer memory 16 to the formatter unit 20.

The bus 19 is a data bus for performing the transfer of the data of the different units in the transmission unit 10. For example, the data transfer between the CPU 12 and the RAM 13, the transfer of the data input to the input I/F 15 to the RAM 13, the transfer of the data from RAM 13 to the buffer memory unit 16, etc. are carried out via this bus 19.

The FEC generation unit 90 adds the error correction code to the transmission data input to the transmitter $10_{-i}$. In this embodiment, a forward error correction code (Reed-Solomon code) is used as the error correction code. Note that the error correction code produced in the FEC generation unit 90 is a code for correcting transmission error used when data is transmitted. It is not a code for correcting error when recording and reproducing data to and from the mass storage 17.

The CPU 12 makes the input interface 15, the buffer memory unit 16, and the output interface 18 execute a variety of commands based on a command from the transmission controller 50 in accordance with a program stored in the ROM 11. Specifically, it stores the program data input from the switcher 40 in the mass storage 17 by a predetermined format. The format of storage of the program data at this time and the operation of the CPU 12 will be explained in detail later. Further, the CPU 12 controls the transfer of data stored in the mass storage 17 to the formatter unit 20.

Next, an explanation will be made of the configuration and operation of the formatter unit 20.

The formatter unit 20 is constituted by n number of formatters $20_{-1}$ to $20_{-n}$.

Figure 6:
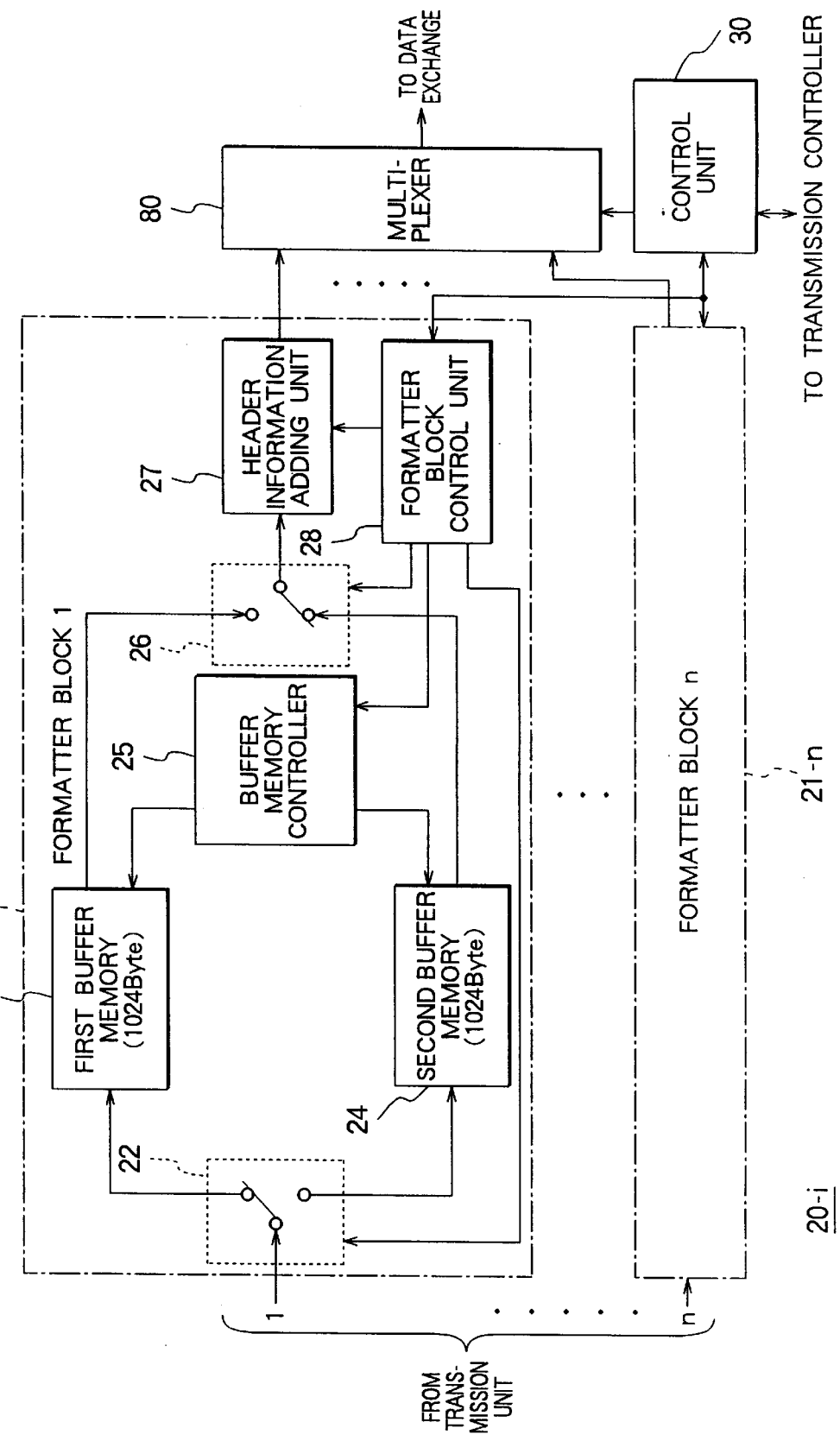
FIG. 6 is a view of the configuration of a formatter unit of a data transmission apparatus shown in FIG. 1 according to the second embodiment of the present invention.

FIG. 6 shows the configuration of the formatter $20_{-i}$ (i=1 to n).

The formatter $20_{-i}$ has n number of formatter blocks $21_{-1}$ to $21_{-n}$, a multiplexer 29, and a control unit 30. The formatter blocks $21_{-i}$ (i=1 to n) each have a first switch 22, first buffer memory 23, second buffer memory 24, buffer memory controller 25, second switch 26, header information adding unit 27, and formatter block control unit 28.

The n number of formatter blocks $21_{-1}$ to $21_{-n}$ are provided corresponding to the n number of output channels for each of the transmitters $10_{-1}$ to $10_{-m}$. The formatter blocks $21_{-1}$ to $21_{-n}$ form ATM cells from the output data and output them to the multiplexer 29. The operation of the components of the formatter blocks $21_{-1}$ to $21_{-n}$ will be explained first.

The first switch 22 alternately inputs the data supplied from the transmitter $10_{-1}$ to the first buffer memory 23 and the second buffer memory 24 based on a control signal from the formatter block control unit 28.

The first buffer memory 23 and second buffer memory 24 store the data input from the transmitter $10_{-1}$. The first buffer memory 23 and the second buffer memory 24 each have a capacity of 1024 bytes, that is, the 1 sector unit of transfer. The first buffer memory 23 and the second buffer memory 24 are controlled by the buffer memory controller 25.

The buffer memory controller 25 controls the first and second buffer memories 23 and 24 based on the control signal from the formatter block control unit 28. The buffer memory controller 25 successively alternately writes and reads data to and from the first and second buffer memories 23 and 24 so as to store the data from the transmitter $10_{-1}$ in the second buffer memory 24 when the data stored in the first buffer memory 23 are transmitted and store the data from the transmitter $10_{-1}$ in the first buffer memory 23 when the data stored in the second buffer memory 24 are transmitted, and makes continuous data transmission possible. The buffer memory controller 25 also successively reads data from the first and second buffer memories 23 and 24 in 47-byte units.

The second switch 26 suitably selects the data read from the first and second buffer memories 23 and 24 based on a control signal from the formatter block control unit 28 and outputs it to the header information adding unit 27.

The header information adding unit 27 adds header information to each 47 bytes of data read from the first and second buffer memories 23, 24 to generate the ATM cells. In this embodiment, the data is transmitted by Protocol Type 1 of the ATM adaptation layer (AAL). Accordingly, the header information adding unit 27 adds to 47 bytes of successively supplied data 1 byte of an SAR-PDU header comprised of 4 bits of sequence no. data and 4 bits of sequence no. protection data and 5 bytes of an ATM header containing the address information of the destination of transfer of the cell to produce the 53-byte ATM cell.

The formatter block control unit 28 controls the first switch 22, the buffer memory controller 25, and the header information adding unit 27 based on a control signal from the control unit 30 so as to make them perform desired operations.

The ATM cells output in parallel from the formatter blocks $21_{-1}$ to $21_{-n}$ are input to the multiplexer 29.

The multiplexer 29 performs time-division multiplexing on the ATM cells output in parallel from the n number of formatter blocks $21_{-1}$ to $21_{-n}$ and outputs the result to the data exchange 60.

The control unit 30 controls the n number of formatter blocks $21_{-1}$ to $21_{-n}$ and the multiplexer 29.

Next, an explanation will be made of the format of the data transmitted from the data transmission apparatus of the present embodiment and the method of construction of the same referring to FIG. 7 to FIG. 13.

Figure 7:
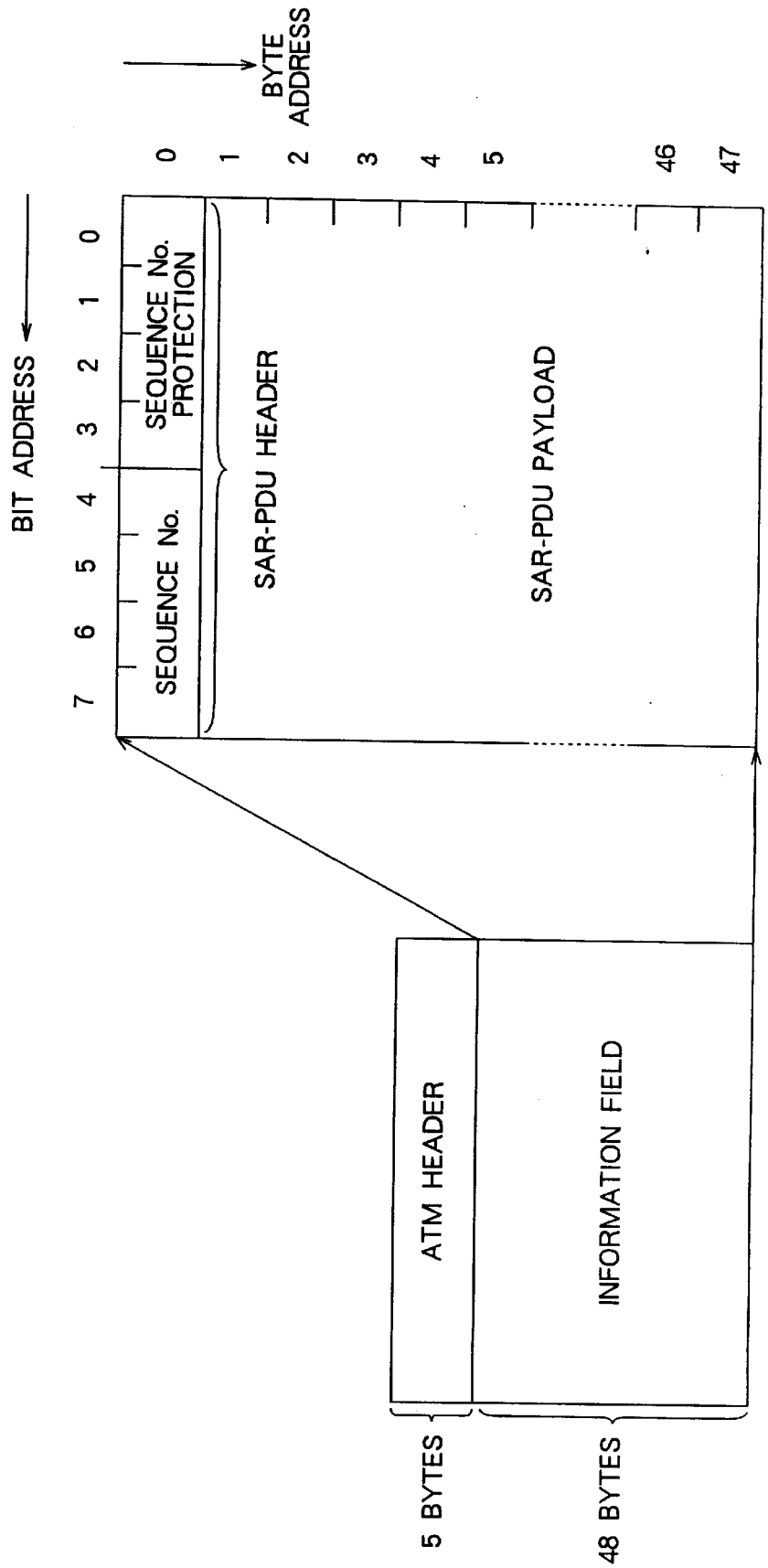
FIG. 7 is a view of an information field in AAL Type 1.

First, an explanation will be made of the format of the data transmitted from the data transmission apparatus of the present embodiment referring to FIG. 7.

The data transmission apparatus 1 of this embodiment uses the ATM (asynchronous transfer mode) as the mode of transfer and transmits the program data by the Protocol Type 1 of the ATM adaptation layer (AAL). The format of the ATM cell and the format of the cell of the AAL type 1 will be explained referring to FIG. 7.

In the ATM, all information is transmitted divided into 53-byte packets called "cells". The format of such a cell is shown in FIG. 7. One cell is comprised of 5 bytes of an ATM header and 48 bytes of an information field. The ATM header includes address information on the destination of transfer of the cell etc. The cell is used as a unit for time-division multiplexing etc. and is transferred in the network.

The AAL Type 1 is a service for a virtual channel mode designed for constant bit rate information such as sound/pictures. As shown in FIG. 7, the 48 bytes of the information field of the AAL Type 1 have an SAR-PDU (cell Segmentation and Reassembly sub-layer Protocol Data Unit) format. The first byte is the SAR-PDU header which is comprised of 4 bits of sequence no. data and 4 bits of sequence no. protection data and it is an information for detecting a missing of the transmission data and an error of the order of the data. The remaining 47 bytes constitute the region for storing the data transferred, that is, the SAR-PDU payload.

Next, an explanation will be made, referring to FIG. 8 to FIG. 13, of the operation for recording the input program data in the mass storage 16 of any transmitter $10_{-i}$ (i=1 to m) in the transmission unit 10 in a state suited for construction of the above-mentioned ATM cells. The processing is performed by the CPU 12 in the transmitter $10_{-i}$, so the operation of the CPU 12 will be explained referring to the flow charts shown in FIG. 8 and FIG. 9 showing the operation.

Figure 8:
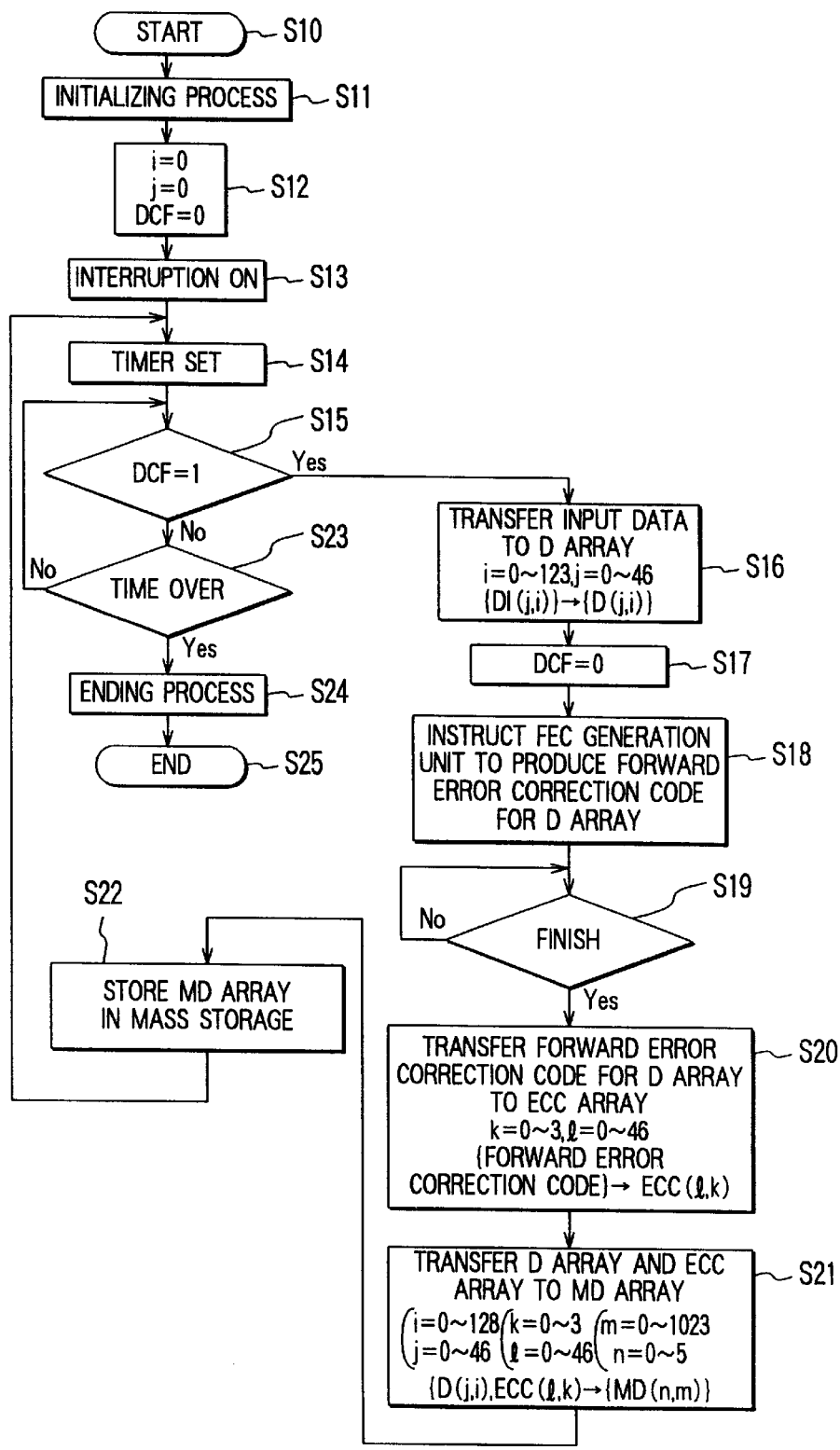
FIG. 8 is a flow chart for explaining the operation of the CPU of the transmitter shown in FIG. 4.
Figure 9:
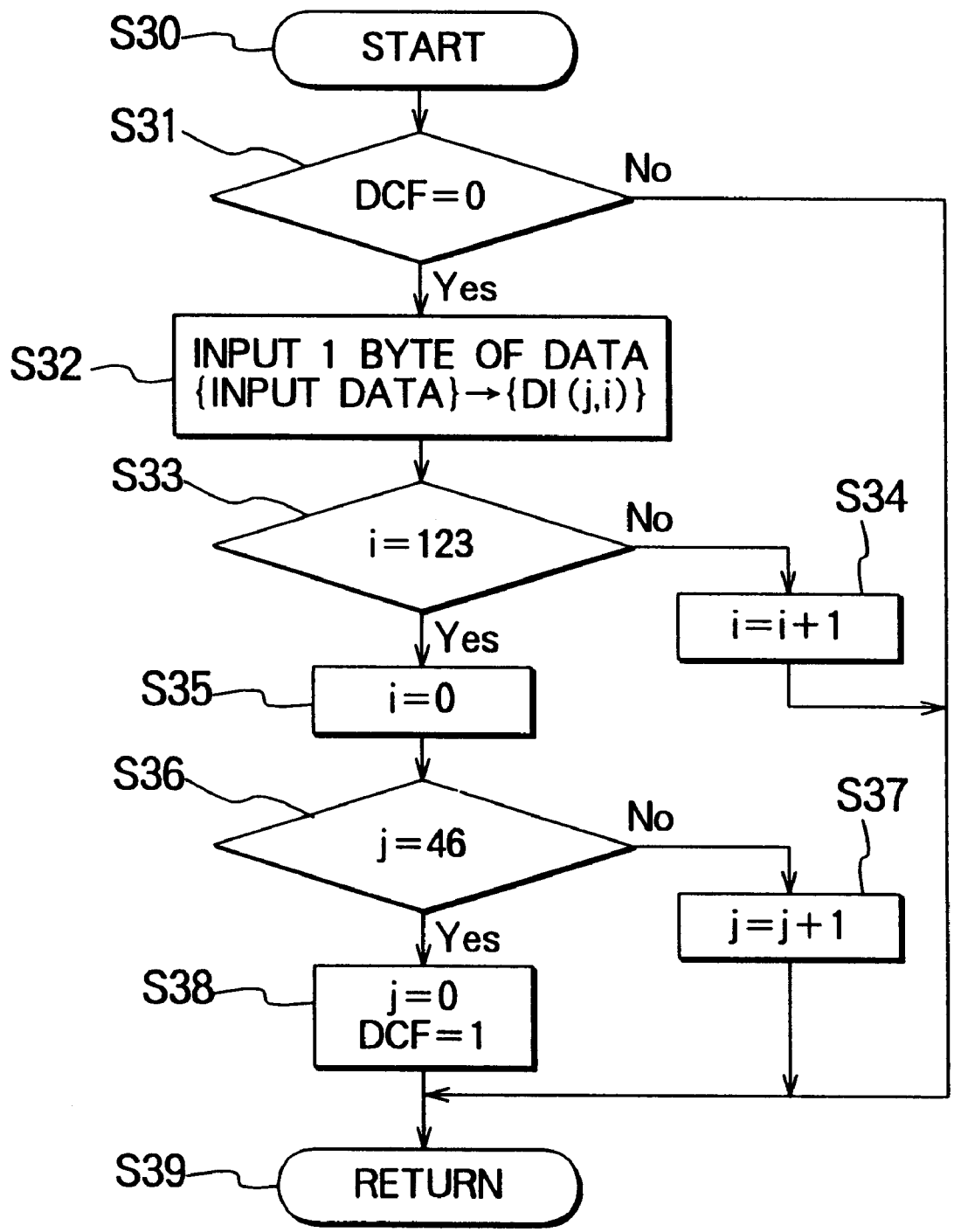
FIG. 9 is a flow chart of the operation for interruption processing in the CPU of the transmitter shown in FIG. 4.

In FIG. 8 and FIG. 9, the array DI is a 47×124 array for temporarily storing the input data, the array D is a 47×124 array for storing the input data, the array ECC is a 47×4 array for storing the forward error correction code, and the array MD is a 6×1024 array for storing the data recorded in the mass storage. Further, the flag DCF is a flag showing that all of the array DI is filled with the data, that is, 47×124 bytes of data are input. The variables i and j are variables showing the address of the data on the array.

First, the CPU 12 of the transmitter $10_{-i}$ (i=1 to n) starts the processing (step S10). It then performs the initializing process (step S11) and resets the variables i and j and the flag DCF (step S12). The initializing process of step S11 for example includes processing for opening a file on the mass storage 17 and for securing the array etc. on the RAM 13 for recording data.

Next, the CPU turns the interruption on (step S13). As a result, when data is input to the transmitter $10_{-i}$ the CPU 12 processes the data by the interruption process shown by the flow chart of FIG. 9.

The interruption process will be explained next referring to FIG. 9.

First, when an interruption signal is input (step S30), the flag DCF is checked. When the flag DCF is not 0 (step S31), the interruption process is immediately ended (step S39). This shows that a state where the newly input data cannot be stored in the array DI since the array DI is already full and transfer to the array D has not yet ended. In this case, storage of the data which is input is put on standby until the transfer of the data of the array DI to the array D is ended.

When the flag was 0 at step S31, 1 byte of data which was input is stored in the array DI(j,i) (step S32). It is then judged if the variable i is 123 (step S33). When the variable i is not equal to 123, that is, when the variable i is smaller than 123, the variable i is incremented by 1 (step S34) and the interruption process is ended (step S39).

At step S33, when the variable i is equal to 123, the variable i is reset (step S35) and a check is made as to if the variable j is equal to 46 (step S36). When the variable j is not equal to 46, that is, when the variable j is smaller than 46, the variable j is incremented by 1 (step S37) and the interruption process is ended (step S39).

At step S36, when the variable j is equal to 46, the variable j is reset, the flag DCF indicating that the 47× 124 array DI has become full with the input data is set to 1 (step S38), and the interruption process is ended (step S39).

Referring again to FIG. 8, an explanation will be made of the main process of the CPU 12.

When the interruption is turned on at step S13, the timer for detecting the end of the input of data is made valid (step S14). That is, the timer is set so as to be able to detect a time corresponding to the maximum time of the time intervals where 47×124 bytes of data are to be input in a normal operation. In the state where the flag DCF is not "1", that is, in the state where the 47×124 bytes of data are not input (step S15), it is judged that the time has run out when a time more than the set time elapses (step S23) and the ending process (step S24) is started. This ending process includes processing for closing the file on the mass storage 17 recording the data and freeing an area on the RAM 13.

Figure 10:
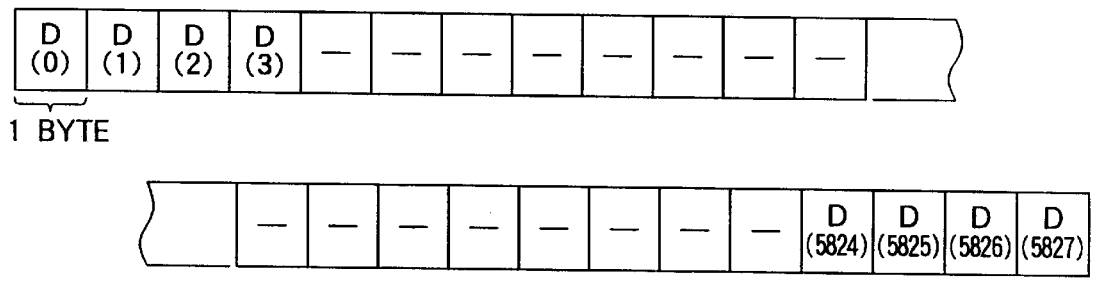
FIG. 10 is a view of the arrangement of the transmission data.
Figure 11:
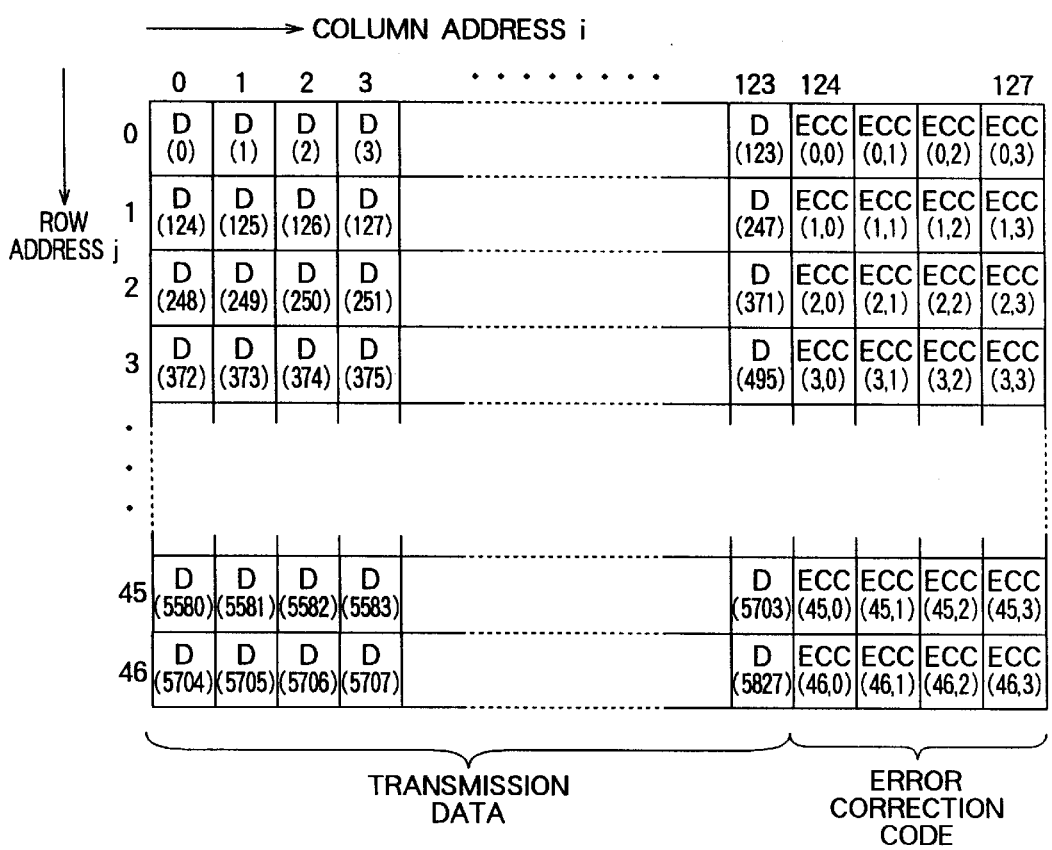
FIG. 11 is a view of the relationship between the transmission data and an error correction code.

In this processing, the data input by the interruption process is successively stored in the array DI. When the flag DCF becomes "1" (step S15), the contents of the array DI are transferred to the array D (step S16). As a result, the 5827 bytes of data shown in FIG. 10 are stored in the array D. Note that in FIG. 10 to FIG. 13, the array D is described by 1 dimension, but is exactly the same as an array D described by 2 dimensions. The conversion formula for these descriptions is shown in equation 1 and the correspondence is shown in FIG. 11.

$$D(I)=D([I/124], I-124\times[I/124]) \qquad (1)$$

$$D(j,i)=D(124\times j+i)$$

where, [a] is the largest whole number not exceeding a.

After the data finishes being moved, the flag DCF is reset to 0 (step S17). Due to this, storage of the input data into the array DI becomes possible once again.

After the data finishes being moved to the array D, the CPU 12 instructs the FEC generation unit 90 to generate an error correction code (step S18) and waits for the end of the processing (step S19). Due to this, the FEC generation unit 90 generates a forward error correction code for the data stored in the array D.

After the generation of the error correction code ends (step S19), the CPU 12 transfers the produced error correction code to the array ECC (step S20). The relationship between the data D and the error correction code ECC is shown in FIG. 11. The data of the array D and the array ECC are transferred to the array MD which is suited for transfer of data to the mass storage 17 (step S21). The rearrangement to the array MD transfers the data of the array D and the array ECC arranged as shown in FIG. 11 to the array as shown in FIG. 12. The data is moved by the conversion equations shown in equation 2 and equation 3:

$$MD(s,t)=D(j+124\times(i-47\times j)) \qquad (2)$$

where,
i=t+1024×s,
j=[i/47], and
[a] is the largest whole number not exceeding a.

$$MD(s,t)=ECC(k-47\times 1, 1) \qquad (3)$$

where,
k=t-708,
1=[k/47] and
[a] is the largest whole number not exceeding a.

The CPU 12 records the data transferred to the array MD sequentially to the mass storage 17 in units of 1024 bytes (step S22). The data of 1024 bytes of each row in FIG. 12 is recorded in the mass storage 17.

After the data finishes being recorded, the processing from step S14 on is repeated.

When the input data ends, as explained above, the time runs out (step S23) and the processing is ended.

Next, an explanation will be made of the data construction method in the case of reading out the data recorded in the mass storage 17 and producing and transmitting ATM cells.

When transmitting data, the 47 successive bytes of data from the header data constitute the SAR-PDU payload of one ATM cell. That is, 1024 bytes of data for each row of the array MD shown in FIG. 12 are transferred at one time to the formatter $20_{-i}$. In the formatter $20_{-i}$, 47 successive bytes of data are read as one block, 5 bytes of an ATM header and 1 byte of an SAR-PDU header are added by the header information adding unit 27 in the formatter $20_{-i}$, and thereby a 53-byte ATM cell is assembled and output. The relationship between the data of the assembled ATM cell and the arrays D, ECC, and MD is shown in FIG. 13.

Figure 13:
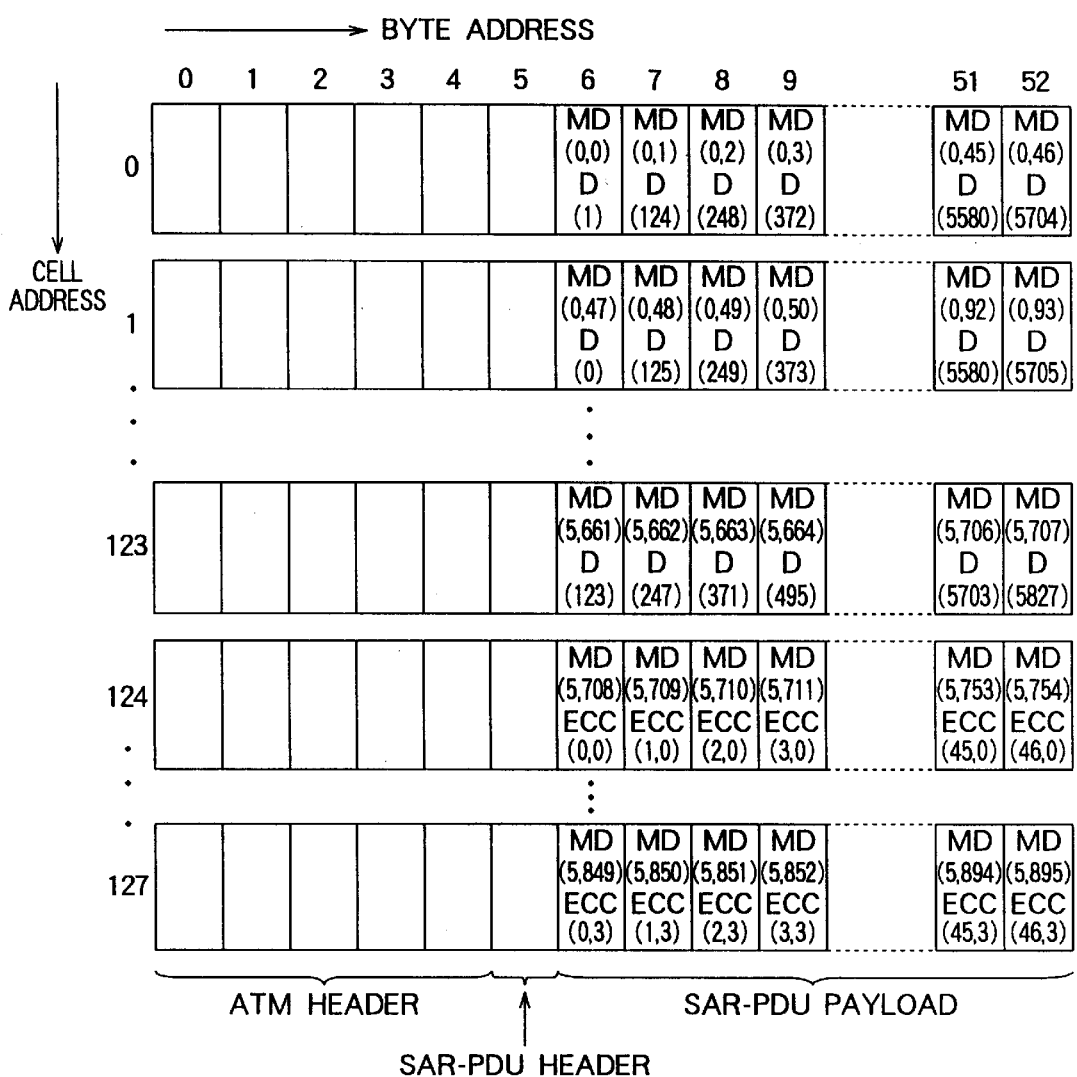
FIG. 13 is a view of the arrangement of transmission data in an ATM cell.

FIG. 13 is a view of the arrangement of the transmission data in an ATM cell.

In this way, each cell is configured by 5 bytes of an ATM header, 1 byte of an SAR-PDU header, and 47 bytes of data in an order equal to the order of the data stored in the mass storage 17.

In this way, according to the data transmission apparatus 1 of the second embodiment, the program data is stored in a format corresponding to the transmission data and the error correction code added at the stage of storing the program data in the transmitter $10_{-i}$. As a result, the m×n number of error correction code generating circuits required for example in the data transmission apparatus of the first embodiment due to the provision of the n number of formatter blocks for each of the m number of formatters may be reduced to m number in the data transmission apparatus of the second embodiment since it is sufficient to provide one each for the m number of transmitters. Accordingly, the hardware configuration becomes much simpler.

Since there is no longer any of the complicated data access or difficult calculating process such as for the generation of the error correction code, the processing for transmission of data, which requires real time processing, can be increased in speed. In other words, the response to a request for data transmission becomes faster. Accordingly, even functions for reproducing and transmitting data from a storage apparatus upon request, such as fast-forwarding or rewinding of a program, can be performed immediately with almost no time lag from the request.

Third embodiment

In the second embodiment explained above, the processing for adding the error correction code in the transmitter $10_{-1}$ (i=1 to n) is performed by a dedicated circuit, that is, the FEC generation unit 90. The processing for adding the error correction code, however, may also be performed by the CPU 12 in the transmitter $10_{-i}$. The data transmission apparatus of this configuration is explained as a third embodiment.

The configuration of the transmitter $10_{-i}$ in the data transmission apparatus of the third embodiment is shown in FIG. 14.

The transmitter $10_{-i}$ of FIG. 14 has the configuration of the transmitter of the second embodiment shown in FIG. 4 minus the FEC generation unit. The configurations of the rest of the components are substantially the same.

The CPU 12 of the transmitter $10_{-1}$ of the third embodiment performs processing for adding the error correction code itself at a step corresponding to step 18 and step 19 in the operation shown by the flow chart in FIG. 8 and FIG. 9.

Even with this configuration and operation, it is possible to realize a data transmission apparatus performing a similar operation as the second embodiment. Further, in the data transmission apparatus of the third embodiment, while the load on the CPU in the transmitter increases, there is no longer any need for an error correction code generating circuit, one of which had to be provided for each of the m number of transmitters in the data transmission apparatus of the second embodiment. As a result, the hardware configuration becomes even simpler.

Accordingly, when CPU 12 has a performance sufficient for generating an error correction code with the demanded specifications and when desiring to simplify the hardware configuration as much as possible is desired, the data transmission apparatus of the third embodiment is suitable.

As explained above with reference to the first embodiment to third embodiment, according to the data transmission apparatus of the present invent ion, it is possible to easily configure the format converting means. As a result, the rate of transmission can be made higher. Further, the hardware can be made smaller in size and less expensive, so it is possible to provide a data transmission apparatus able to handle multiple channels.

INDUSTRIAL APPLICABILITY

The data transmission apparatus and data transmission method of the present invention may be used for the data transmission apparatus for a video-on-demand (VOD) system and a near-video-on-demand (NVOD) system.

I claim:

1. A data transmission apparatus comprising:
   an error correction code adder for preliminary adding an error correction code for collecting transmission error to information data prior to adding a header and processing said information data for transmission by a predetermined transmission method to generate at the time of transmission error correction code added data;
   a storage device for storing said error correction code added data and operative to output the same in parallel to a plurality of channels;
   a plurality of format converters provided for the respective channels of said storage device for converting the error correction code added data output to the respective channels to transmission data having a transmission format in accordance with said predetermined transmission method; and
   a transmitter for transmitting said transmission data to a transmission line in accordance with said predetermined transmission method.

2. A data transmission apparatus as set forth in claim 1, wherein
   said storage device rearranges said information data and said error correction code into an array corresponding to the transmission format.

3. A data transmission apparatus as set forth in claim 2, wherein
   said storage device divides said rearranged information data and error correction code into blocks of a predetermined unit to generate block data.

4. A data transmission apparatus as set forth in claim 1, wherein
   said error correction code adder adds a Reed-Solomon code to said information data as said error correction code.

5. A data transmission apparatus as set forth in claim 1, wherein
   each said format converter divides the error correction code added data output from said respective channels of said storage device into predetermined units and adds predetermined head information to said divided data to generate said transmission data.

6. A data transmission apparatus as set forth in claim 5, wherein
   each said format converter further divides said error correction code added data into predetermined units based on an asynchronous transfer mode (ATM) data transmission method.

7. A data transmission apparatus as set forth in claim 1, comprising:
   multiplexer for multiplexing the transmission data from said plurality of format converters to generate multiplexed data; and
   said transmitter transmits said multiplexed data to the transmission line in accordance with said predetermined transmission method.

8. A data transmission method including the steps of:
   adding an error correction code for correcting transmission error to information data prior to adding a header and processing said information data by a predetermined transmission method to generate at the time of transmission error correction code added data;
   storing said error correction code added data in a storing device operative to output the same in parallel to a plurality of channels;
   converting the error correction code added data output to the respective channels by the storing device to transmission data having a transmission format in accordance with said predetermined transmission method; and
   transmitting said transmission data in accordance with said predetermined transmission method.

* * * * *